April 24, 1945.　　　F. C. MURRAY　　　2,374,297
LOCKING DEVICE
Filed May 7, 1941　　　2 Sheets-Sheet 1
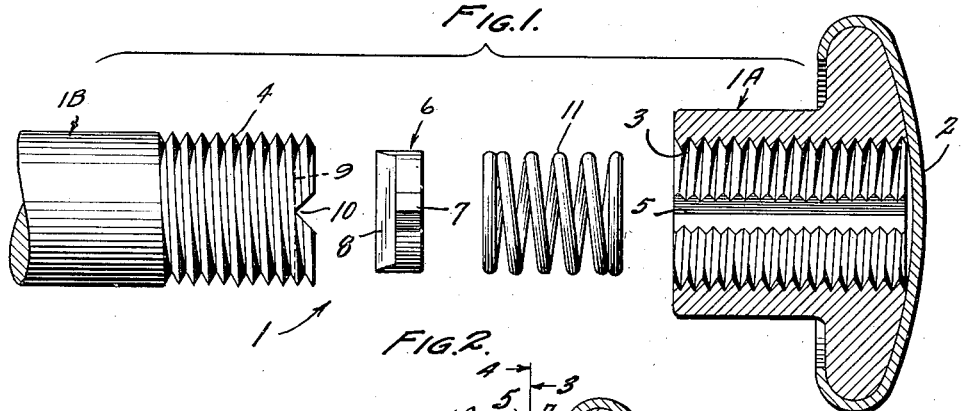
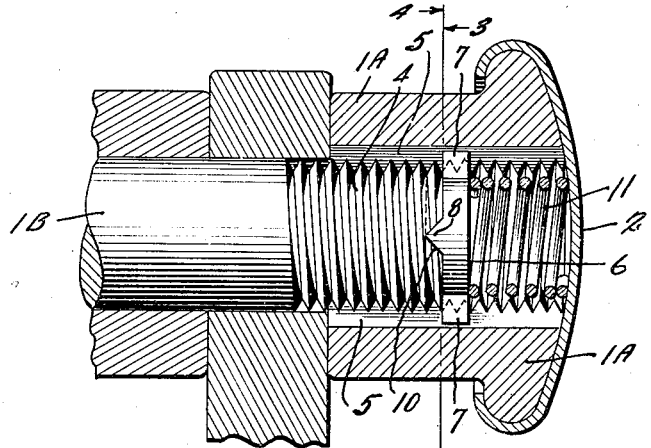
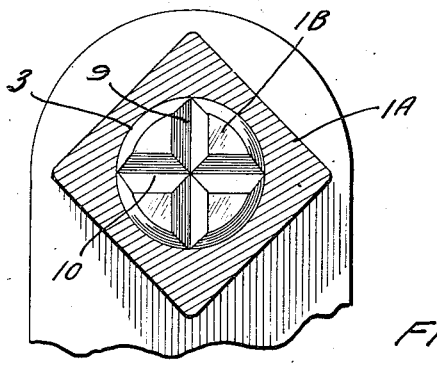
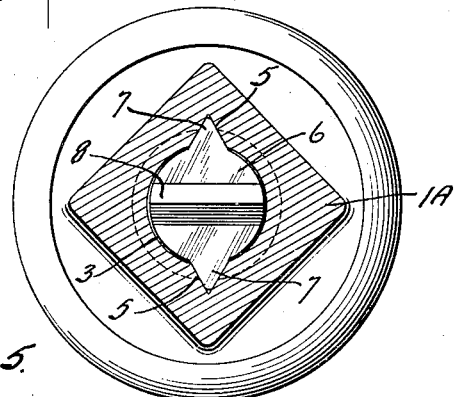
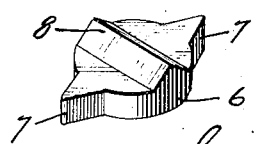
Inventor
FRANCIS C. MURRAY
By Semmes, Keegin, Beale & Semmes
Attorneys

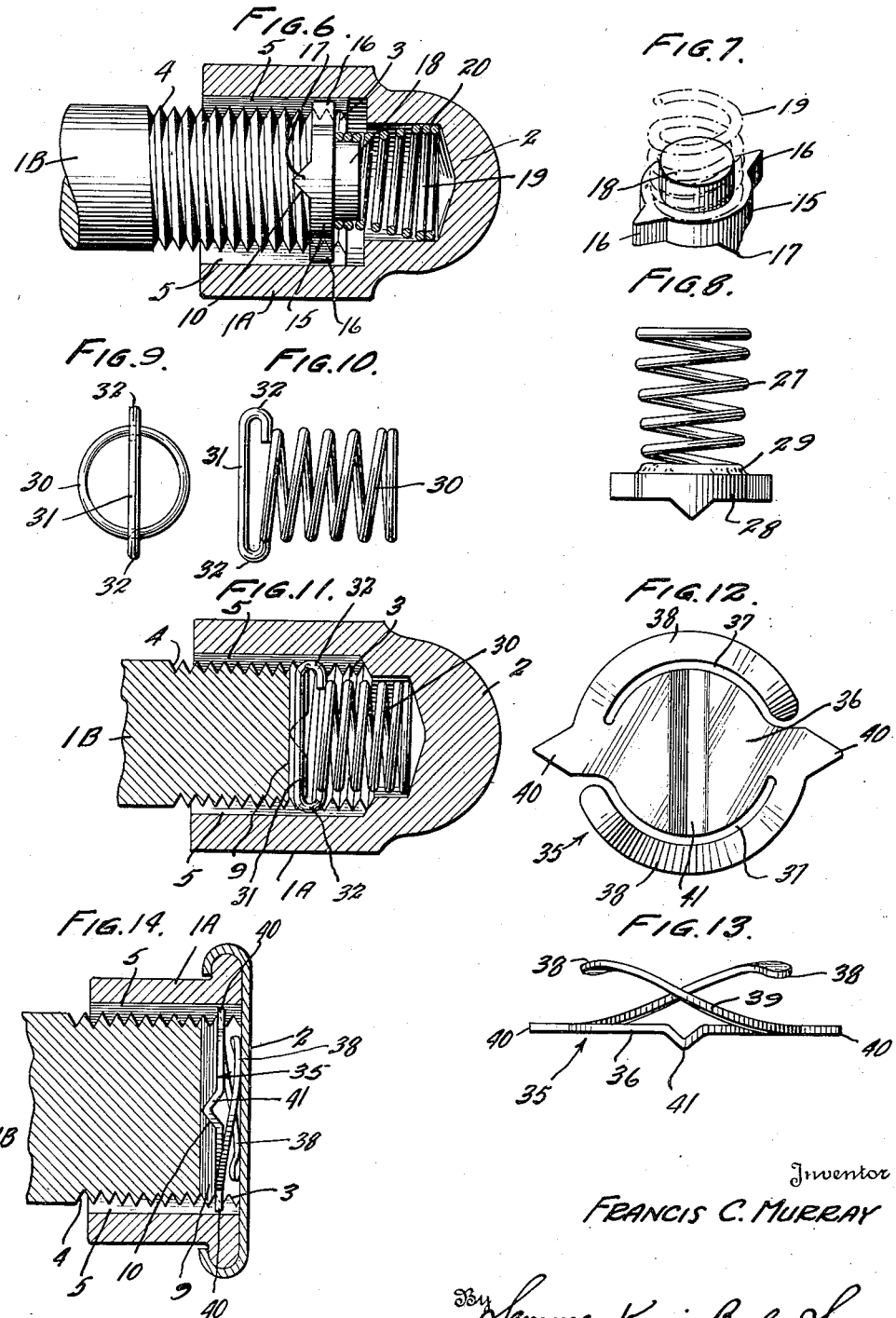

Patented Apr. 24, 1945

2,374,297

UNITED STATES PATENT OFFICE 2,374,297

LOCKING DEVICE

Francis C. Murray, Kittanning, Pa.

Application May 7, 1941, Serial No. 392,377

5 Claims. (Cl. 151—27)

Generically, the present invention relates to locking devices, and specifically, it has reference to a bolt and nut assembly wherein means are provided to prevent rotation between the bolt and the nut due to vibration and ordinary friction between the nut and its associated parts.

While numerous devices have heretofore been provided to afford a lock nut construction, the majority of these prior devices have been undesirable for two principal reasons. Firstly, they have been too complex in structural details and in operation and consequently the cost of manufacture has been prohibitive. Secondly, it has been difficult to incorporate the locking units into conventional bolt and nut devices.

An object of the present invention is to overcome the disadvantages now inherent in this art.

Another object is to provide a bolt and nut construction with means for positively preventing rotation between the elements due to vibration, etc.

A further object is to provide a locking device that can be readily incorporated with the nut and bolt combinations now on the market with a minimum of alteration.

And a further object is to provide a bolt and nut assembly that will prevent rotation of the elements due to any vibrations, shocks, etc., yet will permit the nut to be readily removed from the bolt when desired.

A further object is to provide a bolt and nut device that comprises few salient working parts and that can be cheaply and easily manufactured.

To accomplish the above and other objects, the invention embraces providing the interior of a cap nut with diametrically opposed longitudinal keyways in which move diametrically opposed keys formed on a ribbed member which is in turn adapted to cooperate with grooves formed in the end of the bolt. Spring means is positioned between the ribbed member and the nut to maintain the ribbed member in the grooves in the bolt end when the spring is under pressure. The ribbed member is so formed that when pressure is exerted thereon it is restrained from moving out of the groove and is also maintained in a plane perpendicular to the axis of the bolt. Consequently, when the nut is in its drawn up position, neither the bolt nor the nut can rotate relative to the other due to vibration or the like.

I have shown several different constructions that may be employed to practice my invention, but the salient feature is common to all of the embodiments.

In order to make my invention more clearly understood, I have shown in the accompanying drawings means for carrying the same into practical effect without limiting the improvements in their useful applications to the particular constructions which, for the purpose of explanation, have been made the subject of illustration.

In the drawings:

Figure 1 is an exploded view showing the various elements constituting one form of my nut and bolt combination.

Figure 2 is a fragmental longitudinal sectional view of the form of my invention illustrated in Figure 1 showing the nut in its locked position.

Figure 3 is a sectional view taken along the line 3—3 of Figure 2 looking in the direction of the arrows.

Figure 4 is a sectional view taken along the line 4—4 of Figure 2 looking in the direction of the arrows.

Figure 5 is a view in perspective of the locking disc or pawl.

Figure 6 is a fragmental longitudinal sectional view of a modified form of construction that may be used.

Figure 7 is a view in perspective of the pawl or disc employed in the device covered in Figure 6 showing the manner in which the spring is disposed on the disc in the dot-dash lines.

Figure 8 is a view in side elevation of a modified type of spring and disc that can be used, the end coil of the spring being brazed or otherwise attached to the upper plane face of the disc or pawl.

Figure 9 is an end elevation of still a further form of my inventive concept.

Figure 10 is a view in side elevation of the device shown in Figure 9.

Figure 11 is a fragmental longitudinal sectional view of the device shown in Figures 9 and 10, in its locked position.

Figure 12 is a top plan view of still a further type of construction that may be employed.

Figure 13 is a view in side elevation of the construction shown in Figure 12.

Figure 14 is a view in fragmental longitudinal section showing the member illustrated in Figure 12 in its locked position.

In Figures 1 to 5, the numeral 1 designates generally my locking device and it comprises a nut 1A and a bolt 1B. The nut 1A is of the cap type having a closed end 2 and also it is provided with an internal threaded bore 3. The threads 3 are adapted to engage external threads 4 formed on the end of the bolt 1B when the nut is rotated thereon.

As best depicted in Figure 4, the aperture of the nut 1A has diametrically opposed longitudinally extending V-shaped keyways 5. A circular disc member 6 having diametrically opposed V-shaped keys 7 is disposed within the nut 1A so that the keys 7 register with the keyways 5, as shown in Figures 2 and 4. The lower face of the disc 6 carries a V-shaped rib 8 that extends diametrically across the disc and is arranged at right angles to the keys 7. The rib 8 cooperates with a pair of V-shaped grooves 9 and 10 provided in the end of the bolt 1B, and it can be seen that the grooves 9 and 10 extend at right angles to each other. Of course, it is to be understood that a more or less number of grooves may be used. A compression spring 11 is disposed between the plane face of the disc 6 and the end of the nut 1A to urge the disc toward the end of the bolt.

It will be noted that as the nut 1A is drawn up on the bolt 1B, the rib 8 engages alternately the grooves 9 and 10 until the desired position of the nut on the bolt is effected. At this point, the spring 11 will maintain the rib in the groove against any forces such as, vibration or shock. Moreover, the disc 6 will be maintained in a plane perpendicular to the axis of the bolt 1B since the disc is of such size as to be in contact with the entire area of the end of the bolt. However, there is sufficient compressibility remaining in the spring to permit the nut to be rotated manually on the bolt.

It is thought apparent that I have provided a positive means whereby the rib 8 on the disc is prevented from moving out of either of the grooves or the plane perpendicular to the axis of the bolt 1B. In addition, the assembly is not complex in either structure or operation and can be readily incorporated in conventional nut and bolt constructions.

In Figures 6 and 7, I have shown a modified form of device that may be used. A disc 15 having diametrically opposed keys 16 is disposed within the nut 1A and the keys slide in the longitudinal keyways 5. A V-shaped rib 17 extends diametrically across the disc and fits within the V-shaped grooves 9 and 10 formed in the end of the bolt 1B.

The disc 15 is formed with a spigot or lug 18 and one end of a tapered spring 19 frictionally engages the lug 18, as clearly shown in Figure 6. The opposite end of the spring 19 frictionally engages the walls of a reduced recess 20 formed in the nut 1A. By having the spring 19 in frictional engagement with both the disc 15 and the reduced recess, it is possible to prevent the disc and spring from becoming accidently removed when the nut is taken off of the bolt.

In Figure 8, there is illustrated a disc and spring structure which is very similar to that shown in Figures 6 and 7. However, in this embodiment a tapered spring 27 has one of its end coils brazed to the upper face of a disc 28, as shown at 29. Obviously the spring may be attached to the disc in other manners.

The devices illustrated in Figures 6 to 8 inclusive operate in the same way as the form covered in Figure 1.

Referring now to Figures 9 through 11 inclusive, I provide a helical spring 30, the end coil of which is bent diametrically across the spring, as shown at 31. It will be noted that the portion 31 projects beyond the diameter of the spring 30, thereby affording offset members 32. The offsets 32 slide in the diametrically opposed keyways 5 provided in the threaded aperture 3 of the nut 1A. The portion 31 also is adapted to engage the grooves 9 and 10 formed in the end of the bolt 1B to maintain the nut and bolt in the locked position.

In Figures 12 to 14, there is provided a further modified form of my invention. In this embodiment, a spring lock member indicated 35 is disposed between the end of the bolt and the closed end 2 of the nut 1A. As best shown in Figure 12, the member 35 comprises a body portion 36 made of tempered spring steel. The body is provided with a pair of arcuate slots 37 which form fingers 38 that are bent upwardly out of the plane of the body 36, as indicated at 39 (Figure 13). Diametrically opposed keys 40 are also formed on the body and extending at right angles to the keys is a V-shaped rib 41.

When the member 35 is disposed within the nut 1A the keys 40 register with the keyways 5 in the threaded aperture 3 and the V-shaped rib 41 is adapted to engage the V-shaped grooves 9 and 10 in the end of the bolt 1B when the nut 1A is rotated thereon.

From the foregoing description, it will be appreciated that in each form of my invention, means are provided whereby the ribbed member is prevented positively from moving out of the groove and also maintained in a plane perpendicular to the axis of the bolt. This is particularly efficacious in that rotation of the nut relative to the bolt due to vibration and the like is overcome and there is no danger of the ribbed member tilting in the threaded aperture.

Each embodiment is quite simple in construction and the cost of manufacture is not a serious problem. Furthermore, the devices can be readily installed in conventional bolt and nut structures with a minimum of modification.

In cases where the unit is used to lock structural parts subject to heavy duty, such as, fish plates for railroad rails, or the like, it may be advisable to use the structures illustrated in Figure 1, Figure 6, or Figure 9. However, in connection with elements which are not subject to as much stress, it is probably more advisable to employ the type of unit illustrated in Figures 12 to 14 inclusive.

While I have shown and described the preferred embodiment of my invention, I wish it to be understood that I do not confine myself to the precise details of construction herein set forth by way of illustration, as it is apparent that many changes and variations may be made therein, by those skilled in the art, without departing from the spirit of the invention, or exceeding the scope of the appended claims.

I claim:

1. A fastening device comprising a bolt having a threaded shank and a transverse V groove in the end thereof; a cap nut threaded to operatively engage the threaded shank, longitudinal keyways in the nut and a helically coiled spring disposed within the nut, between the inner end thereof and the grooved end of the shank, said spring having one of its ends disposed diametrically across the spring and extended beyond the outer diameter of the spring to operatively engage both the transverse groove and the longitudinal grooves to restrain movement of the nut with respect to the bolt.

2. A fastening device comprising a bolt having a threaded shank and a transverse V groove in the end thereof, a cap nut threaded to operatively engage the threaded shank, longitudinal keyways in the nut, a helically coiled spring disposed within the nut between the inner end thereof and the grooved end of the shank, one end of said spring being disposed diametrically across the spring perpendicular to the axis thereof for operative engagement with the transverse groove, and U-shaped extensions formed on each extremity of said diametrically disposed end for operative engagement with said keyways.

3. A fastening device comprising a bolt having a threaded shank and a plurality of diametric grooves in the end thereof, a cap nut threaded to operatively engage the threaded shank, said nut having diametrically opposed longitudinal keyways, and a helically coiled spring disposed within the threaded bore between the inner end and the grooved end of the shank, said spring having one of its ends disposed diametrically across the end of the spring and extending into the keyways whereby the diametrically disposed end of the spring will successively engage the diametric V grooves upon rotation of the nut to restrain movement thereof.

4. In a lock nut construction, a bolt having a threaded portion and transverse groove in the end thereof, a cap nut having a longitudinal keyway and internal threads to engage the threaded portion of the bolt, and a helical spring disposed within the bore and having a portion thereof formed into key means for engaging said keyway, one end of said spring engaging the inner end of the nut and the opposite end being disposed transversely thereacross and adapted to engage said transverse groove to restrain relative rotational movement of the nut and bolt when the nut is drawn up on said bolt.

5. In a lock nut construction, a bolt having a threaded portion and a transverse groove in the end thereof, a cap nut provided with a longitudinal keyway and internal threads to engage the threaded portion of the bolt, a substantially circular detent element composed of resilient sheet material within the bore, a diametric rib formed on one face of the detent and adapted to engage said groove, key means formed on the periphery of the detent and adapted to engage the keyways, and arcuate fingers formed adjacent the periphery of the detent element and bent upwardly therefrom to engage the inner end of said nut to urge the rib into said groove when the nut is drawn up on the bolt.

FRANCIS C. MURRAY.